United States Patent Office 3,321,428
Patented May 23, 1967

3,321,428
COMPOSITION CONTAINING WAX AND AN ETHYLENE-UNCONJUGATED DIOLEFIN INTERPOLYMER
John P. Tordella, Wilmington, Del., assignor to E. I. du Pont de Nemours and Company, Wilmington, Del., a corporation of Delaware
No Drawing. Filed Nov. 4, 1963, Ser. No. 321,343
16 Claims. (Cl. 260—28.5)

This invention relates to polymer-modified petroleum wax compositions, and more particularly to compositions comprising petroleum wax and interpolymers of ethylene and unconjugated diolefins.

Petroleum waxes have been commonly used for many years as coatings for paper, paperboard, food products such as fruit, meats, and cheeses, and other materials where it is desired to obtain a protective, water-proof, moisture vapor impermeable coating. However, it has long been recognized that unmodified petroleum waxes are generally unsatisfactory for use as such a coating. The wax coating is easily cracked, chipped, and peeled off the substrate because of inherent deficiencies in such physical properties as adhesiveness, flexibility, hardness, and tensile strength.

The literature reports many attempts to provide improved wax compositions by modifying petroleum wax with various additives such as polyethylene and ethylene-containing copolymers, other natural and synthetic resins, rubbers, and the like. The voluminous amount of such literature by itself is indicative of the complexity of the problem of obtaining a completely satisfactory wax composition and of the general failure to discover an outstanding wax additive. The two types of wax additives which heretofore have been considered as the most satisfactory, by persons skilled in the art, are a certain class of ethylene/vinyl acetate copolymers and a certain class of ethylene/alpha-olefin copolymers, namely, ethylene/propylene and ethylene/butene-1 copolymers.

With the discovery of petroleum wax-ethylene/vinyl acetate copolymer blends, the art was provided with a wax composition which possessed truly remarkably improved properties (as compared to other compositions known theretofore), such as flexibility, adhesiveness, heat sealability, hardness, gloss, high blocking temperature, and other desirable characteristics, since these ethylene/vinyl acetate copolymers proved to be far superior than the other polymeric materials previously proposed for use as wax additives. With the subsequent discovery of petroleum wax-ethylene/alpha-olefin copolymer blends, the art was then provided with a composition which possessed certain physical properties, particularly tensile properties such as extensibility, percent total elongation, tensile strength, yield elongation, and yield stress, in an extent unattainable with petroleum wax modified with ethylene/vinyl acetate copolymers or other polymeric materials used theretofore.

Although the ethylene/vinyl acetate, ethylene/propylene, and the ethylene/butene-1 copolymers are satisfactory for many purposes and have enjoyed considerable commercial success, none of these polymeric wax additives impart to petroleum wax a combination of three important physical properties: (1) a relatively high degree of extensibility, (2) ability to obtain a given desired degree of extensibility with a relatively small amount of polymeric additive, and (3) a low melt viscosity of the resulting petroleum wax-polymeric additive blend to permit easy application to a substrate or its fabrication into any three dimensional configuration. While ethylene/vinyl acetate copolymers impart to petroleum wax a given desired degree of extensibility while maintaining a relatively low melt viscosity of the resulting blend, ethylene/vinyl acetate copolymers are principally deficient in that relatively large amounts of these copolymers are required to obtain any given degree of extensibility. Ethylene/propylene and ethylene/butene-1 copolymers impart to petroleum wax a given desired degree of extensibility with the use of relatively small amounts of these copolymers. However, these ethylene/alpha-olefin copolymers impart excessive melt viscosity to the petroleum wax-copolymer blend at any given degree of extensibility. It is desired to obtain an improved polymeric wax additive which imparts to petroleum wax, a combination of these three important physical properties.

An object of this invention is to provide an improved petroleum wax composition. Another object is to provide an improved petroleum wax composition which contains a relatively small amount of polymeric additive to obtain a given desired degree of extensibility, and which has a relatively low melt viscosity. An additional object is to provide a flexible cellulosic sheet material having a coating adhered thereon which comprises such an improved petroleum wax composition. A further object is to provide a shaped article of manufacture comprising such an improved petroleum wax composition.

These and other objects are attained by the present invention which provides the composition comprising a blend of 50–98% by weight of petroleum wax and 2–50% by weight of an interpolymer of 0.5–30 mole percent copolymerized unconjugated diolefin, and at least 50 mole percent copolymerized ethylene; said interpolymer having an inherent viscosity of 0.8 to 5. For any given degree of extensibility the composition of this invention requires substantially less polymer content than does a corresponding petroleum wax-ethylene/vinyl acetate copolymer blend, and also, for any given degree of extensibility the composition of this invention has a substantially lower melt viscosity than does a corresponding petroleum wax-ethylene/propylene or butene-1 copolymer blend. In fact, at any given degree of extensibility, the wax blends containing either ethylene/propylene or ethylene/butene-1 copolymers are from about 10 to several hundred times more viscous (as measured by the melt indicies of the blends) than blends containing ethylene/1,4-hexadiene copolymers.

The interpolymers used in the composition of this invention must contain copolymerized ethylene and from 0.5 to 30 mole percent copolymerized unconjugated diolefin. Petroleum wax blends containing interpolymers having less than 0.5 mole percent copolymerized unconjugated diolefin are excessively viscous. Interpolymers containing more than 30 mole percent copolymerized unconjugated diolefin are relatively soft and rubbery, and provide insufficient reinforcement to petroleum wax. Optimum results are obtained with interpolymers containing from 5 to 20 mole percent copolymerized unconjugated diolefin. The term "unconjugated" is used herein according to its standard chemical meaning, referring to diolefins wherein the double bonds are separated by at least two single bonds. In other words, an unconjugated diolefin is a diolefin having isolated double bonds, as defined by Brewster, Organic Chemistry, Prentice-Hall, Inc., New York (1953), p. 73, and Wertheim, Organic Chemistry, Blakiston Company, New York (1951), p. 71. The unconjugated diolefin may be straight chain such as, 1,4-hexadiene, 1,6-octadiene, 1,5-decadiene, and the like;

branched chain, that is, dienes having alkyl, alkenyl, cyclic, etc., branching; cyclic, including polycyclic, such as dicyclopentadiene,

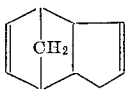

2-alkylnorbornadiene,

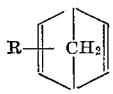

wherein R is an alkyl radical, norborylene,

and the like; and mixed linear and cyclic, such as 4-vinylcyclohexene,

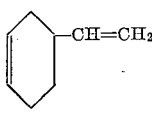

5-methylene-2-norbornene,

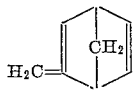

5-alkenyl-2-norbornene including 5-(2' - butenyl)-2-norbornene

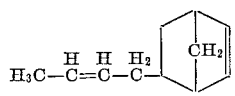

and the like. With these norbornene type compounds having pendant groups which contain an olefinic double bond, the copolymerization with ethylene proceeds through the double bond contained in the cyclic structure, leaving a residual double bond in the pendant side group. The unconjugated diolefins best suited for use in this invention contain 5 to 17 carbon atoms.

The interpolymer must contain at least 50 mole percent copolymerized ethylene since interpolymers containing less amounts of copolymerized ethylene are undesirably soft and elastomeric-like. When the sole copolymerized components of the interpolymer are ethylene and unconjugated diolefin, the interpolymer must contain from 70 to 99.5 mole percent, or preferably 80 to 95 mole percent, ethylene. Interpolymers which contain additional copolymerized monomers are suitable for use in this invention provided the interpolymer contains at least 50 mole percent copolymerized ethylene. Thus it may be stated that the interpolymers of this invention contain 0.5 to 30 mole percent unconjugated diolefin, 50 to 99.5% ethylene and 0 to 49.5% of another copolymerizable monomer. Suitable copolymerizable monomers which may be incorporated into interpolymers for use in this invention include vinyl acetate, vinyl chloride, vinylidene chloride, alkyl acrylates, and methacrylates, such as ethyl ethyl acrylate, butyl acrylate, 2-ethyhexyl acrylate, methyl methacrylate, butyl methacrylate, etc., styrene, alpha-olefins, such as propylene, butene-1, and the like. Particularly suitable interpolymers are ethylene/1,4-hexadiene, ethylene/propylene/1,4-hexadiene, and ethylene/hexene-1/1,4-hexadiene interpolymers, with the latter 3 component interpolymers containing about 60 to 65 mole percent copolymerized ethylene, 30 to 39 mole percent copolymerized propylene or hexene-1, and 1 to 5 mole percent copolymerized 1,4-hexadiene.

The molecular weight of the interpolymer is a critical factor in this invention. Molecular weight may be conveniently expressed in terms of inherent viscosity (i.e., the logarithmic viscosity number), as determined in 0.5 gram/deciliter of decalin at 130° C., by the well-known technique described in ASTM method D 1601-61. The inherent viscosity of the interpolymer of this invention must be from 0.8 to 5. Impractical large amounts of interpolymer are required to provide significant reinforcement of petroleum wax when the inherent viscosity of the interpolymer is less than 0.8. Interpolymers having an inherent viscosity of greater than 5 are extremely difficult to blend with wax, and moreover wax blends containing such interpolymers are extremely viscous. The preferred inherent viscosity range is 1 to 3.

The interpolymers used in this invention may be prepared by any convenient method, such as disclosed in U.S. Patent 2,933,480, issued to Gresham and Hunt; U.S. Patent 3,000,866, issued to Tarney; U.S. Patent 3,063,973, issued to Gladding and Nyce; U.S. Patent 3,093,620, issued to Gladding and Nellis, and U.S. Patent 3,093,621, issued to Gladding.

A very desirable feature of the interpolymers of this invention is that the interpolymer molecules may be crosslinked via the residual double bond of the copolymerized unconjugated diolefin. As indicated above, remarkably less amounts of uncrosslinked ethylene/unconjugated diolefin interpolymer are required to obtain a given degree of extensibility than are required of ethylene/propylene or ethylene/butene-1 interpolymers. Even smaller amounts of interpolymer are required to obtain a given degree of extensibility where the interpolymer of this invention is crosslinked. Normally, crosslinking must be done after the interpolymer and wax are blended together and after the blend is applied or fabricated into its ultimate form, since crosslinking drastically reduces the melt flow rate of the blend. Since smaller amounts of the interpolymer are blended with the wax to obtain a given degree of extensibility where the interpolymer is to be subsequently crosslinked, prior to this crosslinking step, the blend has a substantially lower melt viscosity than would otherwise be obtained, thus making the application or fabrication of the blend much more convenient. A convenient method for crosslinking these interpolymers is by the familiar sulfur curing technique. Alternately, the well-known tellurium, radiation or peroxide curing techniques may be employed.

As little as 2% by weight of the interpolymer added to 98% by weight of petroleum wax imparts to the wax a significant improvement in such physical properties as flexibility, tensile strength, yield elongation, yield strength, hardness, adhesiveness, heat-sealability, gloss, and blocking temperature, and furthermore, imparts a unique combination of (1) improved extensibility, (2) a given degree of extensibility with relatively small amounts of polymeric additive, and (3) a low melt viscosity of the resulting petroleum wax-interpolymer blend. The relative degree of these improvements increases with increasing proportions of the copolymer. However, since the melt viscosity of the resulting composition increases with increasing proportions of the interpolymer, normally it is necessary that the composition contain not more than 50% by weight of the interpolymer. The most preferred compositions of this invention contain some 5 to 20% by weight of the interpolymer and from 80 to 95% by weight of petroleum wax.

The term "petroleum wax" as used herein refers to both paraffin and microcrystalline waxes. Paraffin wax is a mixture of solid hydrocarbons derived from the overhead wax distillate fraction obtained from the fractional distillation of petroleum. After purification, the paraffin wax contains hydrocarbons that fall within the formula $C_{23}H_{48}$—$C_{35}H_{72}$. It is a substantially colorless, hard, and translucent material usually having a melting point of about 125–165° F. Microcrystalline wax is obtained from the nondistillable still residues from the fractional distillation of petroleum. It differs from paraffin wax in having branched hydrocarbons of higher molecular weights. It is considerably more plastic than paraffin wax and usually has a melting point of about 150–200° F. Greater degrees of extensibility are usually obtained at a given interpolymer content for waxes containing relatively large proportions of branched and cyclic structures as compared with waxes having relatively low proportions or no branched and cyclic structures.

The composition of petroleum wax and interpolymer of this invention may be prepared by any convenient method such as by hot-mixing the component in a heated pot equipped with a suitable agitator, or in a Branbury mixer, on a two-roll mill, in a compounding extruder or other such equipment.

Additional materials may be added to the composition of this invention such as inert fillers, pigments, dyes, antioxidants, non-petroleum waxes, tackifiers, other natural or synthetic resins, and the like.

The composition of this invention may be fabricated into shaped articles of manufacture, such as films, fibers, and objects such as containers, toys, and novelty items. The composition of this invention is particularly suitable for coating cellulosic substrates such as paper, paperboard, cellophane, wood, and the like.

This invention is further illustrated by the following examples. In these examples, the compositions were prepared by blending the components, in the proportions indicated, together with 0.025% of 4,4'-butylidene-bis(6-tertiary butyl metacresol) based on the weight of wax and interpolymer, at about 150° C. on a two-roll rubber mill (the rolls being 6 inches in diameter and 16 inches long) until a uniformly mixed composition was obtained (about 5 to 30 minutes). Composition samples were molded into sheets in a laboratory compression press at 150° C. using 10,000 pounds force on the platens. The molded sheets were cooled by circulating cool tap water through the press platens. Dumbbell-shaped samples were die cut (using the micro tensile die described in ASTM method D 1708–59T) from the molded sheets for use as test samples. The test samples were about 1½ inches in overall length, 0.625 inch wide at the large ends, and 0.187 inch wide in the 0.876 inch long test length. The thickness of the test samples varied from 0.040 to 0.060 inch. Tensile data, namely, yield stress (abbreviated "Y.S."), yield elongation (abbreviated "Y.E."), tensile stress (abbreviated "T.S."), and percent elongation at failure (i.e., tensile elongation, the measure of extensibility, abbreviated "EXT"), were obtained using a standard Instron tester at 72° F., 50% relative humidity, and at a crosshead speed of 1 inch per minute, in accordance with ASTM D 638–T. Percent elongation at failure is based on the extent of crosshead separation with respect to the 1 inch test length.

In these examples, melt index (abbreviated "M.I.") is used as the measure of the melt viscosity of the petroleum wax interpolymer blend. Melt index is a measure of fluidity, the inverse of viscosity, measured in a piston-activated capillary viscometer described in ASTM method D 1238–57T. In this test, flow rate in g./10 minutes is reported. Thus, the term "melt index" as used in these examples applies to flow rate in g./10 minutes under the following particular conditions: (a) 0.082 inch capillary diameter, 0.316 inch capillary length; (b) 190° C. temperature; (c) 2160 g. load on the piston. However, for blends whose melt index values would be greater than 100 to 1000, the method of measurement was modified as follows. Flow rates were measured at each of two smaller piston loads, 100 and 325 g. These flow rates were used to calculate the flow rate in g./10 minutes at 2160 g. load on the basis of a graphical linear extrapolation of the data plotted as log flow rate vs. log load to 2160 g. load. This extrapolation is based on the well-known power law which holds approximately: $Q = K \cdot L^c$ where Q is weight rate of flow; and L, load on the piston, and K and c constants. The actual viscosity, n, of the petroleum wax-interpolymer blends may be calculated from the melt index of the blend by the following relations which are based on Poiseuille's equation for capillary flow:

$$n \text{ (poise)} = 8 \times 10^4 / (\text{melt index})$$
$$n \text{ (centipoise)} = 8 \times 10^5 / (\text{melt index})$$

In these examples the melting points of the petroleum waxes were determined by differential thermal analysis ("DTA"). The melting point was taken as the temperature at which the maximum rate of melting occurred at a heating rate of 5° C./minute. The refractive indicies of the petroleum waxes as shown, are relative to the D line of sodium at 100° C.

*Example 1*

This example illustrates the advance made over the art by this invention, by comparing compositions of this invention with blends of petroleum wax and an ethylene/vinyl acetate copolymer heretofore considered to be a preferred wax additive by those skilled in the art. In each test of this example the petroleum wax used was a fully refined paraffin wax having a DTA melting point of 64° C. and a refractive index of 1.426. The ethylene/1,4-hexadiene copolymer (abbreviated "E/HD") used in the example had a copolymerized 1,4-hexadiene content of 11 mole percent, and had an inherent viscosity of 1.67. The ethylene/vinyl acetate copolymer ("E/VA") had a copolymerized vinyl acetate content of 11 mole percent, and had an inherent viscosity of 0.85. The results of this example are summarized in Table I.

TABLE I

| Test No. | Type of Polymer | Weight Ratio, Polymer/Wax | M.I. Blend | Tensile Data | | | |
|---|---|---|---|---|---|---|---|
| | | | | Y.S. (P.s.i.) | Y.E. (percent) | T.S. (P.s.i.) | EXT. (percent) |
| 1 | E/HD | 20/80 | 3,200 | 640 | 33 | 490 | 80 |
| 2 | E/HD | 30/70 | 550 | 900 | 23 | 1,270 | 890 |
| 3 | E/HD | 40/60 | 58 | 790 | 46 | 1,990 | 1,490 |
| 4 | E/VA | 40/60 | 2,200 | | | 840 | 27 |
| 5 | E/VA | 50/50 | 860 | 820 | 34 | 690 | 200 |
| 6 | E/VA | 60/40 | 680 | 860 | 38 | 1,280 | 690 |

These results show that both wax-ethylene/vinyl acetate copolymer blends and wax-ethylene/1,4-hexadiene copolymer blends have outstanding tensile properties. However, it will be particularly noted that far greater amounts of the ethylene/vinyl acetate copolymer are required to obtain a degree of extensibility comparable to that obtained by the ethylene/1,4-hexadiene copolymer. In Test 1, 20 parts of ethylene/1,4-hexadiene copolymer imparted an extensibility of 78%, whereas in Test 4, 40 parts of ethylene/vinyl acetate copolymer provided an extensibility of only 27%, (also note in Test 3, 40 parts of ethylene/1,4-hexadiene copolymer provided an extensibility of 1490%, or over 55 times greater than obtained with the same amount of ethylene/vinyl acetate copolymer). Similarly, in Test 2, 30 parts of ethylene/1,4-hexadiene copolymer imparted an extensibility of 890%, whereas this degree of extensibility was not obtained with even 60 parts of ethylene/vinyl acetate copolymer (note Test 6, where 60 parts ethylene/vinyl acetate copolymer provided an extensibility of only 680%, and Test 5 where 50 parts imparted an extensibility of only 200%).

Example 2

This example further demonstrates the advance made over the art by this invention, by comparing compositions of this invention with blends of petroleum wax and ethylene/alpha-olefin copolymers heretofore considered to be preferred wax additives by persons skilled in the art. The paraffin wax used in Example 1 was used in each test of this example. The ethylene/1,4-hexadiene ("E/HD") copolymer used in this example had a copolymerized 1,4-hexadiene content of 13 mole percent and an inherent viscosity of 1.3. The ethylene/propylene copolymer ("E/P") used in Tests 3 and 4 of this example had a copolymerized propylene content of 13 mole percent and an inherent viscosity of 2.3. The ethylene/propylene copolymer used in Tests 5 and 6 had a copolymerized propylene content of 14 mole percent and an inherent viscosity of 4.8. The ethylene/butene-1 ("E/B") copolymer used in this example had a copolymerized butene-1 content of 7 mole percent and an inherent viscosity of 1.3. The results of this example are shown in Table II:

TABLE II

| Test No. | Type of Polymer | Weight Ratio, Polymer/Wax | M.I. Blend | Tensile Data | | | |
|---|---|---|---|---|---|---|---|
| | | | | Y.S. (P.s.i.) | Y.E. (percent) | T.S. (P.s.i.) | EXT. (percent) |
| 1 | E/HD | 40/60 | 440 | 730 | 29 | 1,040 | 930 |
| 2 | E/HD | 20/80 | 4,000 | | | 610 | 15 |
| 3 | E/P | 40/60 | 4.8 | 920 | 9 | 870 | 1,090 |
| 4 | E/P | 20/80 | 400 | 800 | 8 | 390 | 26 |
| 5 | E/P | 40/60 | 0.8 | 840 | 11 | 1,030 | 800 |
| 6 | E/P | 20/80 | 70 | 750 | 9 | 480 | 140 |
| 7 | E/B | 50/50 | 35 | 1,290 | 10 | 1,070 | 530 |

It will be noted from these data that the tensile properties imparted by the ethylene/alpha-olefin copolymers are comparable to those obtained with the ethylene/1,4-hexadiene copolymer. However, the melt viscosities of the wax-ethylene/1,4-hexadiene copolymer blends are remarkably less than the melt viscosities of the wax-ethylene/alpha-olefin copolymer blends. For example, in Test 1, the melt index (note that melt index is an inverse function of viscosity, i.e., a high melt index indicates a low viscosity) of the blend containing 40 parts ethylene/1,4-hexadiene copolymer was 438, while in Test 3, the 40 parts of ethylene/propylene copolymer imparted a melt index of 4.8 (almost 90 times more viscous). In Test 5, 40 parts of the other ethylene/propylene copolymer gave a melt index of 0.8 (almost 550 times more viscous than the ethylene/1,4-hexadiene copolymer blend). In Test 7, 50 parts of ethylene/butene-1 imparted a melt index of 35.4. Similarly, in Test 2, 20 parts of ethylene/1,4-hexadiene imparted a melt index of 3974, whereas in Test 4, 20 parts of ethylene/propylene copolymer gave a melt index of 398 (about 10 times more viscous), and in Test 6, 20 parts of the other ethylene/propylene copolymer gave a melt index of 69.6 (about 57 times more viscous).

Example 3

This example illustrates the effect of adding to wax, other ethylene/1,4-hexadiene copolymers in accordance with this invention. In all tests of this example, the paraffin wax described in Example 1 was used. In Tests 1–3 of this example, the copolymer had a copolymerized 1,4-hexadiene content of 9 mole percent and an inherent viscosity of 2.1. In Tests 4–6 the copolymer had a copolymerized 1,4-hexadiene content of 10 mole percent and an inherent viscosity of 1.69. The results of this example are shown in Table III below. For convenience of reference, the results obtained with the ethylene/1,4-hexadiene copolymer used in Examples 1 and 2 are reproduced in this table as Tests 7–9 and 10–12 respectively:

TABLE III

| Test No. | E/HD Copolymer | | Weight Ratio, Polymer/wax | M.I. Blend | Extensibility (percent) |
|---|---|---|---|---|---|
| | Mole, Percent HD | Inherent Viscosity | | | |
| 1 | 9 | 2.1 | 40/60 | 28.7 | 861 |
| 2 | 9 | 2.1 | 30/70 | 165 | 910 |
| 3 | 9 | 2.1 | 20/80 | 1,461 | 570 |
| 4 | 10 | 1.69 | 40/60 | 73 | 1,320 |
| 5 | 10 | 1.69 | 30/70 | 462 | 900 |
| 6 | 10 | 1.69 | 20/80 | 1,550 | 75 |
| 7 | 11 | 1.67 | 40/60 | 57.5 | 1,490 |
| 8 | 11 | 1.67 | 30/70 | 548 | 890 |
| 9 | 11 | 1.67 | 20/80 | 3,160 | 78 |
| 10 | 14 | 1.93 | 40/60 | 438 | 930 |
| 11 | 14 | 1.93 | 30/70 | 1,270 | 220 |
| 12 | 14 | 1.93 | 20/80 | 3,974 | 15 |

Example 4

This example illustrates the effect of adding an ethylene/1,4-hexadiene copolymer to various waxes other than the wax used in the preceding examples. The ethylene/1,4-hexadiene copolymer used in Example 2 was used in all of the tests of this example. All of the waxes used in this example were microcrystalline. The DTA melting points and refractive indicies of these waxes are indicated in Table IV which summarizes the results of this example:

TABLE IV

| Test No. | Wax | | Weight Ratio, Copolymer/wax | M.I. Blend | Extensibility (percent) |
|---|---|---|---|---|---|
| | Melting Point, °C. | Refractive Index | | | |
| 1 | 55 | 1.444 | 30/70 | 631 | 1,090 |
| 2 | 55 | 1.444 | 20/80 | 6,229 | 43 |
| 3 | 55 | 1.444 | 15/85 | 9,500 | 41 |
| 4 | 65 | 1.439 | 30/70 | 631 | 790 |
| 5 | 65 | 1.439 | 20/80 | 6,155 | 44 |
| 6 | 65 | 1.439 | 15/85 | | 33 |
| 7 | 73 | 1.437 | 30/70 | 780 | 830 |
| 8 | 73 | 1.437 | 20/80 | 6,100 | 180 |
| 9 | 73 | 1.437 | 15/85 | | 60 |
| 10 | 75 | 1.438 | 30/70 | 707 | 820 |
| 11 | 75 | 1.438 | 20/80 | 6,600 | 34 |
| 12 | 75 | 1.438 | 15/85 | | 26 |

Example 5

This example illustrates the effect of cross-linking the ethylene/1,4-hexadiene interpolymer in a petroleum wax-interpolymer blend. The interpolymer described in Example 1 was used in all of the tests of this example. The petroleum wax used in Example 1 was used in Tests 1–7 of this example. A microcrystalline wax having a DTA melting point of 75° C. and a refractive index of 1.438 was used in Tests 8–10. The petroleum wax-interpolymer blends were prepared as described above. In Tests 1–4 the following curing formula was added to the prepared blend by milling with the blend on a two-roll rubber mill at 100° C. for about 10 minutes:

| | |
|---|---|
| Sulfur | 0.5 part by weight per hundred parts copolymer in blend. |
| Piperidinic salt of pentamethylene dithiocarbamic acid | 2 parts by weight per hundred parts copolymer in blend. |
| Zinc oxide | 5 parts by weight per hundred parts copolymer in blend. |

This material was then molded into sheets and subjected to 10,000 pounds force in a compression press at 150° C. for 30 minutes, which accomplished the crosslinking. Samples of this material were then tested as described above. In Tests 5–7 this curing formula was doubled. In Tests 8–10 this curing formula was quadrupled. These three levels of crosslinking are indicated as 1X, 2X, and 4X, respectively, in Table V which shows the results of this example. For convenience of reference, the results obtained in Example 1 with the uncrosslinked copolymer are reproduced in this table as Tests 11–13:

TABLE V

| Test No. | Weight Ratio, Copolymer/wax | Level of Crosslinking | Extensibility (percent) |
|---|---|---|---|
| 1 | 40/60 | 1X | 1,200 |
| 2 | 20/80 | 1X | 1,030 |
| 3 | 15/85 | 1X | 80 |
| 4 | 10/90 | 1X | 18 |
| 5 | 20/80 | 2X | 680 |
| 6 | 15/85 | 2X | 620 |
| 7 | 10/90 | 2X | 14 |
| 8 | 10/90 | 4X | 70 |
| 9 | 7.5/92.5 | 4X | 55 |
| 10 | 5/95 | 4X | 23 |
| 11 | 40/60 | None | 1,490 |
| 12 | 30/70 | do | 890 |
| 13 | 20/80 | do | 78 |

*Example 6*

This example illustrates the use of a terpolymer containing 63.5 mole percent of copolymerized ethylene, 35.3 mole percent of copolymerized propylene and 1.2 mole percent of copolymerized 1,4-hexadiene and having an inherent viscosity of 2.7. In Tests 1 and 2, this terpolymer was uncrosslinked, and in Tests 3 and 4 the petroleum wax-terpolymer blend contained the curing formula described in Example 5 (1X, level of crosslinking). The petroleum wax used in Example 1 was used in all the tests of this example. The results of this example are summarized in Table VI:

TABLE VI

| Test No. | Weight Ratio Polymer/wax | Level of Crosslinking | M.I. Blend | Extensibility (percent) |
|---|---|---|---|---|
| 1 | 40/60 | None | 8.75 | 865 |
| 2 | 20/80 | do | 1,297 | 55 |
| 3 | 40/60 | 1X | | 1,865 |
| 4 | 20/80 | 1X | | 190 |

Although this invention has been described in considerable detail, obviously there are many variations which can be made in these details without departing from the spirit and scope of this invention. Therefore, it is to be understood that this invention is not intended to be limited except as defined by the appended claims.

I claim:

1. The composition comprising a blend of 50–98% by weight of petroleum wax and 2–50% by weight of an interpolymer of 0.5 to 30 mole percent of a copolymerized unconjugated diolefin and at least 50 mole percent copolymerized ethylene, said interpolymer having an inherent viscosity of 0.8 to 5.

2. The composition of claim 1 wherein the said interpolymer contains 5 to 20 mole percent copolymerized unconjugated diolefin, 80 to 95 mole percent copolymerized ethylene, and has an inherent viscosity of 1 to 3.

3. The composition of claim 2 wherein the said unconjugated diolefin is 1,4-hexadiene.

4. The composition of claim 1 wherein the said interpolymer contains 1 to 5 mole percent copolymerized 1,4-hexadiene, 60 to 65 mole percent copolymerized ethylene, 30 to 39 mole percent copolymerized propylene, and has an inherent viscosity of 1 to 3.

5. The composition comprising a blend of 80 to 95% by weight of paraffin wax and 5 to 20% by weight of an interpolymer of 0.5 to 30 mole percent of a copolymerized unconjugated diolefin and at least 50 mole percent copolymerized ethylene, said interpolymer having an inherent viscosity of 0.8 to 5.

6. The composition of claim 5 wherein the said interpolymer contains 5 to 20 mole percent copolymerized unconjugated diolefin, 80 to 95 mole percent copolymerized ethylene, and has an inherent viscosity of 1 to 3.

7. The composition of claim 6 wherein the said unconjugated diolefin is 1,4-hexadiene.

8. The composition of claim 5 wherein the said interpolymer contains 1 to 5 mole percent copolymerized 1,4-hexadiene, 60 to 65 mole percent copolymerized ethylene, 30 to 39 mole percent copolymerized propylene and has an inherent viscosity of 1 to 3.

9. A flexible cellulosic sheet material having the composition of claim 1 coated thereon.

10. A flexible cellulosic sheet material having the composition of claim 5 coated thereon.

11. A shaped article of manufacture comprising the composition of claim 1.

12. A shaped article of manufacture comprising the composition of claim 5.

13. The composition of claim 1 wherein the said interpolymer is crosslinked.

14. The composition of claim 4 wherein the said interpolymer is crosslinked.

15. The composition of claim 5 wherein the said interpolymer is crosslinked.

16. The composition of claim 8 wherein the said interpolymer is crosslinked.

References Cited by the Examiner

UNITED STATES PATENTS

| | | | |
|---|---|---|---|
| 2,731,370 | 1/1956 | Tramm et al. | 260—28.5 |
| 3,182,033 | 5/1965 | Gregorian | 260—28.5 |
| 3,210,305 | 10/1965 | Coenen et al. | 260—28.5 |

MORRIS LIEBMAN, *Primary Examiner.*

B. A. AMERNICK, *Assistant Examiner.*